US007572512B2

United States Patent
Brinley et al.

(10) Patent No.: US 7,572,512 B2
(45) Date of Patent: Aug. 11, 2009

(54) SOL-GEL COMPOSITE AR COATING FOR IR APPLICATIONS

(75) Inventors: Erik Brinley, Orlando, FL (US); Sudipta Seal, Oviedo, FL (US); Edit Braunstein, Orlando, FL (US); Leslie Kramer, Longwood, FL (US)

(73) Assignees: University of Central Florida Research Foundation, Orlando, FL (US); Lockheed Martin Missiles and Fire Control, Bethesda, MD (US)

( * ) Notice: Subject to any disclaimer, the term of this patent is extended or adjusted under 35 U.S.C. 154(b) by 0 days.

(21) Appl. No.: 11/681,469

(22) Filed: Mar. 2, 2007

(65) Prior Publication Data

US 2007/0207325 A1 Sep. 6, 2007

Related U.S. Application Data

(60) Provisional application No. 60/778,328, filed on Mar. 2, 2006.

(51) Int. Cl.
*B32B 15/04* (2006.01)
*B32B 15/00* (2006.01)
(52) U.S. Cl. ........................ 428/432; 428/697; 428/702
(58) Field of Classification Search ................. 428/215, 428/688, 690, 696, 432, 482, 428; 427/162, 427/164, 165; 359/621; 350/166
See application file for complete search history.

(56) References Cited

U.S. PATENT DOCUMENTS

| 4,278,632 A | | 7/1981 | Yoldas |
| 4,830,879 A | * | 5/1989 | Debsikdar ................... 427/162 |
| 4,929,278 A | * | 5/1990 | Ashley et al. .......... 106/287.12 |
| 5,077,239 A | * | 12/1991 | Singh et al. .................... 501/40 |
| 5,206,189 A | | 4/1993 | Caldwell |
| 5,536,857 A | | 7/1996 | Narula et al. |
| 6,124,974 A | * | 9/2000 | Burger ....................... 359/621 |
| 6,566,805 B1 | * | 5/2003 | Tsai et al. .................... 313/504 |
| 2003/0180548 A1 | | 9/2003 | Costa et al. |
| 2004/0118749 A1 | | 6/2004 | Lesemann et al. |
| 2004/0121451 A1 | | 6/2004 | Moritz et al. |
| 2004/0263983 A1 | * | 12/2004 | Acree ......................... 359/586 |
| 2006/0096926 A1 | | 5/2006 | Mazyck et al. |

FOREIGN PATENT DOCUMENTS

| EP | 1016637 | 7/2000 |
| JP | 3232730 | 10/1991 |
| JP | 5058649 | 3/1993 |
| WO | WO98/45113 | * 10/1998 |

OTHER PUBLICATIONS

WO1998/045113 description.*

* cited by examiner

*Primary Examiner*—Timothy M Speer
*Assistant Examiner*—Lauren Robinson
(74) *Attorney, Agent, or Firm*—Patents On Demand, P.A.; Neil R. Jetter

(57) ABSTRACT

An infrared transmissive article includes an infrared transmissive substrate and a single layer anti-reflective (AR) composite broadband sol gel coating on a surface of the substrate. The AR coating includes a first chalcogenide including compound, and a second chalcogenide including compound intermixed with the first chalcogenide including compound. The percentages of the first chalcogenide and the second chalcogenide in the AR coating are selected to provide a refractive index of the AR coating that approximates the square root of a refractive index of the substrate.

9 Claims, 6 Drawing Sheets

SOL-GEL COMPOSITE AR COATING FOR IR APPLICATIONS

CROSS-REFERENCE TO RELATED APPLICATIONS

This application claims benefit of U.S. Provisional Patent Application Ser. No. 60/778,328, filed on Mar. 2, 2006, entitled "A Sol-Gel Composite Optical Coating For IR Applications" which is incorporated herein by reference.

STATEMENT REGARDING FEDERALLY SPONSORED RESEARCH OR DEVELOPMENT

Not applicable.

FIELD OF THE INVENTION

The invention relates to infrared transmissive articles having chalcogenide comprising anti-reflective (AR) composite coatings on infrared transmissive substrates.

BACKGROUND OF THE INVENTION

Chalcogenide glasses are made up of group IV-VI elements, group II-VI elements, or other combinations. The group VI chalcogenides include oxygen, sulfur, selenium, tellurium. Of considerable interest is their transmission throughout the infrared region and their non-linear refractive index. Further, such materials have high chemical stability. Common applications for these glasses include night vision systems and thermal imaging. Both applications exploit the relatively high transmissivity of the chalcogenide glass throughout the infrared region of light.

Anti-reflection (AR) is of major importance in a variety of systems, particularly in systems where multiple pieces of glass are used. Even a small reflection, if multiplied by a large number of glass surfaces, can result in significant transmission losses. By applying AR coatings, transmission can be maximized for enhanced efficiency and transmission quality. Another major factor to be considered is the refraction of the light when it passes through a piece of glass. When light passes through a medium it is bent, thereby traveling slower. This change in the speed which light encounters can cause reflection. In window glass, such as a in a car window, the light is only bent a small amount and, therefore, only a small reflection is produced. However, for chalcogenide glass, the light is bent more significantly. Accordingly, AR coatings are particularly important for chalcogenide glasses.

Increasing transmission results from a reduction in reflection. To provide an AR coating layer on a substrate to optimize transmission for one specific wavelength requires that the coating layer to have both a specific thickness and a specific refractive index. The simplest interference AR coating consists of a single quarter-wave thick layer of transparent material whose refractive index is the square root of the underlying substrate's refractive index ($n_{coating} = (n_{substrate})^{1/2}$). This theoretically gives zero reflectance at the center wavelength and decreased reflectance for wavelengths in a broadband around the center.

Multi-layer AR coatings can be used to expand the properties of a single layer, among many layers. Using this arrangement, many layers of different thicknesses and refractive indices can be layered to allow for enhanced transmission for different wavelengths.

Current AR coating fabrication techniques are generally limited to two broad categories. The first involves the creation of a coating that has very high transmission for a certain wavelength of light. This technique is very useful for applications that use particular wavelengths of light, as in most lasers. The second type is termed broadband coatings. Some of the techniques used to create these functional coatings include multilayer coatings (MLC), sub-micron structures, and sol-gel derived AR coatings.

The sol-gel process is a versatile well-known low temperature solution process for making inorganic ceramic and glass materials. In general, the sol-gel process involves the transition of a system from a liquid "sol" (mostly colloidal) into a solid "gel" phase. Applying the sol-gel process, it is possible to fabricate ceramic or glass materials in a wide variety of forms including ultra-fine or spherical shaped powders, thin film coatings, ceramic fibers, micro porous inorganic membranes, monolithic ceramics and glasses, or extremely porous aerogel materials.

The starting materials used in the preparation of the "sol" are usually alkoxides. In a typical sol-gel process, the precursor is subjected to a series of hydrolysis and polymerization reactions to form a colloidal suspension, or a "sol". Hydrolysis of an alkoxide liberates alcohol and results in polymerized chains of metal hydroxide. For example, silica gels can be formed by hydrolysis of tetraethoxysilicate (TEOS; an alkoxide having the formula $Si(OC_2H_5)_4$) based on the formation of silicon oxide $SiO_2$ and ethyl alcohol $C_2H_5OH$ as noted below:

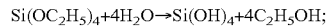

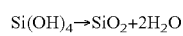

Multilayer coatings are effective for transmission across a large range of wavelengths. The two major drawbacks of this technique are intrinsic to the properties of complicated coatings. The challenge becomes how to maintain coating thickness while minimizing defects. Further, multilayer coatings can be mechanically unsound when compared to single layers.

Finally, sol-gel derived AR coatings, being the easiest to apply, show the most potential in broadband applications. Unlike MLCs, single layer sol-gel coatings are very mechanically sound and are simple to create with minimal defects. Also, similarly to sub-micron structured AR techniques, sol-gel derived AR coatings use sub-micron particles to affect both the refractive index and the light scattering within the coating.

One of the most common coating materials used for anti-reflective properties is silica ($SiO_2$). However, other material combinations can be used to achieve similar refractive index values while still using the mechanically strong sol-gel derived thin film. Examples of alternative materials that use a particular chalcogenide glass as a thin film are $As_2S_3$ or $Ge_{45}Se_{55}$. These materials have very low absorbance in the infrared region and combinations of these materials can be used to alter the refractive index through a wide range. Similar systems can be developed that include the use of many different coating materials to achieve the desired refractive gradient, such as an $As_2Se_3/BaF_2/air$ system, which depends on the densification of the film through heat treatments for mechanical stability. Although such a coating is generally feasible for obtaining the desired optical qualities, the strength of the film cannot be fully achieved without subsequent heat treatments to at least several hundred degrees C. to densify, reduce porosity, and create stronger linkage between constituent elements. However, such heat treatments can degrade optical properties of the films. What is needed is a new composition and low temperature process for forming broadband single layer AR coatings.

SUMMARY

An infrared transmissive article comprises an infrared transmissive substrate and a single layer anti-reflective (AR) composite broadband sol-gel coating on a surface of the substrate. The AR coating comprises a first chalcogenide comprising compound, and a second chalcogenide comprising compound different from the first chalcogenide comprising compound intermixed with the first chalcogenide comprising compound. The percentages of the first chalcogenide and said second chalcogenide in the AR coating are selected provide a refractive index for the AR coating that approximates the square root of a refractive index of the substrate. As used herein, "approximates the square root of a refractive index of the substrate" refers the average refractive index of the coating being within 5%, preferably less than 2%, of the square root of a refractive index of the substrate, measured in the near IR range of about 1 to 5 microns.

The thickness of the AR coating is generally nanoscale, such as <200 nm. In one embodiment, the AR coating thickness is 50 nm, and 100 nm in another embodiment.

In one embodiment the first chalcogenide comprising compound is silica and said second chalcogenide comprising compound is titania. In this embodiment, the coating can essentially consist of silica and titania.

A primary particle size distribution in the coating can have a peak at between about 2-10 nm. The substrate can be a chalcogenide substrate, such as a silica substrate, or a variety of other substrates. In the case of a substrate that has a refractive index of about 2.7 at about 3 microns, the refractive index of the AR coating in a wavelength range from 1 to 5 microns can be from 1.62 to 1.66.

A % transmissivity of the coated substrate can average at least 70% over a majority of a wavelength range from 1.5 to 5 micrometers. The AR coating can have a gradient of refractive index across its thickness, wherein the refractive index of the AR coating is lower at its surface as compared to a bulk of the coating. The gradient can comprises a difference in refractive index from 1 to 5% from the surface to the bulk of the AR coating.

A method for forming composite anti-reflective (AR) sol gel coatings comprises the steps of forming a first chalcogenide comprising sol, reacting the first chalcogenide comprising sol with a reagent for hydrolysis, forming a second chalcogenide comprising sol, reacting the second chalcogenide comprising sol with a reagent for hydrolysis, and mixing the first and second chalcogenide comprising sol to form a composite sol-gel. In one embodiment, the first chalcogenide comprising sol can comprise silica and said second chalcogenide sol can comprise titania. The maximum temperature used in the method can be limited to no more than 100 C. The low processing maximum processing temperature of 100 C results in the as-formed amorphous sol-gel composite remaining essentially fully amorphous.

The method can further comprise the step of coating the composite sol-gel on an infrared transmissive substrate, such as a chalcogenide glass substrate. The coating step can comprise dip coating or spin coating.

BRIEF DESCRIPTION OF THE DRAWINGS

There is shown in the drawings embodiments which are presently preferred, it being understood, however, that the invention can be embodied in other forms without departing from the spirit or essential attributes thereof.

DETAILED DESCRIPTION OF THE INVENTION

The present invention comprises composite sol-gel derived coating compositions and low cost methods for forming the same. Such coatings have been found to provide broadband optical properties in the low (near) infrared range of about 1 to 5 microns, and can be used as single layer AR coatings to form infrared transmissive articles which include an underlying IR transmissive substrate, such as a chalcogenide glass substrate. The AR coating includes a first chalcogenide including compound, and a second chalcogenide including compound intermixed with the first chalcogenide including compound. The percentages of the first chalcogenide and the second chalcogenide in the AR coating are selected to provide a refractive index of the AR coating that approximates the square root of the refractive index of the substrate.

The inventive coating can be applied to a wide variety of IR transmissive substrates. IR transmissive substrates can include silicon, germanium, zinc sulfide, zinc selenide and certain chalcogenide substrates, including silica.

A variety of sol-gel precursors can be used with the present invention including ceria, silica, titania, vanadium oxide, and magnesium fluoride sols. In a preferred embodiment, the respective sols comprising the composite have the same oxidation state and are of similar size. The silicon in silica and titanium in titania have the same oxidation state and can also provide the same size particles. In a preferred embodiment, sol-gel precursors for both silica and titania are used to form a composite sol gel material including both silica and titania. The ability to vary the amounts of the various components can be used to create a desired refractive index necessary across a broad range of refractive indexes for AR coatings on a wide variety of chalcogenide glass substrates, which can present a wide variety of substrate refractive indexes.

Figure 1:
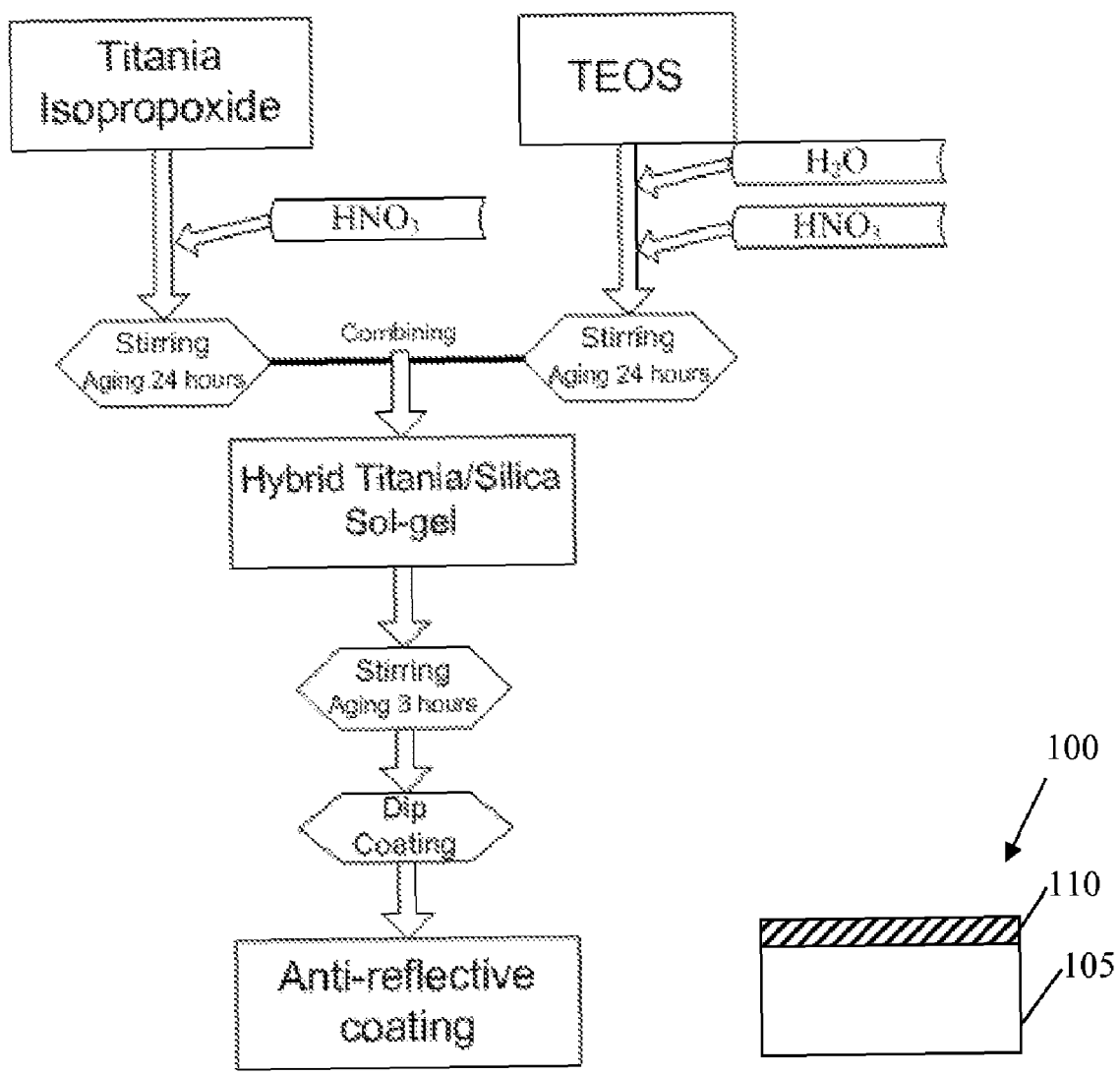
FIG. 1 is a flow chart detailing steps to create an exemplary composite sol-gel derived composite coating according to an embodiment of the invention. Two sol-gel solutions are prepared and aged separately before mixing. The process flow shown includes the step of dip coating the composite sol gel on a chalcogenide substrate to provide an AR coating thereon. A cross sectional view of the AR coated substrate is also provided.

FIG. 1 is a flow chart detailing steps to create an exemplary composite titania/silica sol-gel derived composite coating according to an embodiment of the invention. Two sol-gel solutions, comprising titania isopropoxide (titanium precursor) and TEOS (silica precursor) are prepared and aged separately for 24 hours as shown in FIG. 1 before mixing to form the hybrid titania silica sol-gel. The hybrid titania silica sol-gel is then stirred and aged 3 hours. The flow shown includes the step of dip coating the hybrid sol-gel on a chalcogenide substrate to provide an AR coating thereon. A cross sectional view of the AR coated substrate 100 is also provided showing the hybrid titania silica sol-gel coating 110 on the surface of the chalcogenide substrate 105. The thickness of the hybrid titania silica sol-gel coating 110 is generally nanoscale, such as <200 nm.

More generally, a method for forming composite AR coatings comprises the steps of forming a first chalcogenide comprising sol, reacting the first chalcogenide comprising sol with a reagent for hydrolysis, forming a second chalcogenide comprising sol, reacting the second chalcogenide comprising sol with a reagent for hydrolysis, and mixing the first and second chalcogenide comprising sols to form a composite sol-gel. The chalcogenide comprising sols can be silica and titania to form a titania/silica sol-gel. In a preferred embodiment of the invention, a maximum temperature used in the method is no more than 100° C.

The method generally includes the step of coating the sol-gel on a chalcogenide glass substrate. The coating step can comprise dip coating or spin coating. Dip coating or spin coating makes the composite sol-gel cheaper as compared to conventional methods. By using either of these coating methods, there is no need for heat to be applied, vacuum to be used, nor is expensive specialized equipment required.

A broadband anti-reflective composite coating comprises a first chalcogenide comprising compound, and a second chalcogenide comprising compound intermixed with the first chalcogenide comprising compound. The coating has an amorphous structure characteristic of a maximum processing temperature of less than 100 C. In a preferred embodiment, the first chalcogenide comprising compound is silica and the second chalcogenide comprising compound is titania. The primary particle size distribution of the composite coating can have a peak at between about 2-10 nm. The composite coating is generally disposed on an IR transmissive substrate, such as a silica or silicon substrate.

The sol-gel solution is easy to prepare from commercially available chemicals as detailed in the Examples below. Thus, the sol-gel process according to the invention is very cost effective, and the chemistry of the coating can be varied as per demand of the coating. As noted above, AR coatings on chalcogenide glasses can provide a wide range of refractive indicies. For example, the refractive index of the composite coating according to the invention can be designed to approximates the square root of a refractive index of the substrate, such as in the range of 1.62 to 1.66 to approximate the square root of an underlying chalcogenide substrate having a refractive index of about 2.7.

Sol-gel coatings according to the invention have been found by the present Inventors to generally be significantly more porous on the surface of the coating because during processing the volatile organic material is removed more easily at the surface of the coating. Increased porosity creates a lower refractive index (refractive index (RI) of air averaged with the RI of sol-gel solids) at the surface of the coating as compared to the bulk refractive index of the coating, due to more air and less solid. This porosity distribution generally creates a gradient of refractive index across the sol-gel film, such as a difference in refractive index from 1 to 5%, or more, such as in the wavelength range from 1 to 5 microns.

Such a refractive index gradient has been found to result in increased transmission by removing a portion of reflections which would result from a conventional single refractive index AR coating (having a constant refractive index throughout the coating thickness). As a result, the present invention provides the surprising and unexpected result because although the general rule for AR coatings is to create a coating having a refractive index equal to the square root of the refractive index of the glass (or other substrate surface) to be coated and a thickness equal (or very close to being equal, such as within about 5%) to ¼ the wavelength of light desired to process, AR coatings according to the invention generally provide optical performance that can be regarded as being thickness tolerant. Specifically, the thickness of the sol-gel derived coating being close to the ¼ the wavelength is not critical when using composite sol-gel coatings according to the invention, since thickness deviations from ¼ the wavelength can generally be tolerated while still maintaining good performance at coating thicknesses of 20 to 30% away, or more, from the ¼ wavelength thickness value. Significantly, thus using the sol-gel technique according to the invention it is possible to create a single AR coating that is useful for providing enhanced transmission over a large range of wavelengths, such as 1 to 5 microns, referred to herein as broadband.

The coating material and method described herein is a low cost, room temperature capable process that makes use of the unique properties of sol-gel, while significantly enhancing the optical transmission of infrared substrates in the near infrared region. The creation of a coating that is a viable AR coating for infrared substrates at several wavelengths in the near infrared region is presented herein. This considerable gain in transmission, at points within the 1.5-5 micron wavelength range as described in the Examples below, is an important step forward in AR coatings and should prove to be of future interest as the applications of infrared substrates including chalcogenides in this region, as well as at other wavelengths, are more fully realized.

The invention is described generally for AR coatings. AR coatings reduce reflections and ghost images while enhancing the transmission of light. This is especially important when a large number of surfaces are used, such as in microscopes, camera lenses or endoscopes. The invention can also be used to increase optical transmission in a wide range of applications that are served in the UV, visible and infrared range, in lighting systems, laser technology, projection systems, and even in medical applications such as mirrors, band-pass filters for information technology, coatings for displays, and more.

EXAMPLES

It should be understood that the Examples described below are provided for illustrative purposes only and do not in any way define the scope of the invention.

As described above, FIG. 1 is a flow chart detailing steps to create an exemplary composite sol-gel coating according to an embodiment of the invention which will be utilized in the present example. The first component comprised a silica sol-gel which was created with equal parts tetraethylorthosilicate (TEOS) (+99%) and ethanol (anhydrous, 85%). The sol reaction utilizes nitric acid for hydrolysis and DI water, added drop wise, for water condensation. The sol was then covered, to prevent evaporation, and was then left for aging for a day.

The second component of the composite sol-gel is the titania. The titania film component was formed using titanium (IV) Isopropoxide (97%), 2-Propanol (Grade GC, 99.7%), and DI water. Isopropoxide was added to the propanol to avoid evaporation.

The two sol-gel components were then combined after their appropriate aging cycles into one larger container. This mixture was stirred to ensure proper combination of the two constituents. The two individual sols were clear in color and devoid of emulsion before combination. After mixing, the solution became a mild yellow color. This yellow color will not affect the final coating due to the extremely thin nature of the coating generally used in practical applications, such as being around 50 nm.

The aged sols, both silica and titania, were tested individually on fused silica glass slides. The film consistencies were confirmed through both visual observation and optical microscope. After the verification of acceptable aging times was completed, the two sols were mixed and stirred. The coating was done promptly following mixing to avoid gelation. The coatings on the chalcogenide glass were carried out under room temperature conditions.

A dip coating instrument (KSV Instruments, Ltd. Dip Coater) was used to control vibrational effects and to increase the homogeneity of the film thickness. The rate used for withdrawal was 85 cm/min. At this rate, inconsistencies due to vibration were avoided. For coating the glass slides the instrument was equipped with a standard gripping mechanism. However, for the chalcogenide glass, of circular design, nearly 0.5 cm thick, it was found to be desirable to fashion a holding ring of platinum wire. The glass slides and chalcogenide glass samples were cleaned prior to dipping in order to ensure a consistent coating surface.

Important aspects of sol-gels are generally particle size, pH, and refractive index. These were analyzed for both of the sol-gel components, and of the material in its composite form.

Particle size measurements were performed using the Zetasizer (Malvern Instruments-Nano-Series with cell type DTS0012 disposable sizing curvette). The dispersant chosen was a 2-Propanol with viscosity 2.400 cP and a refractive index of 1.377 at a temperature of 25° C. The material property test setting was a silica-titania composite with a refractive index of 1.375.

The pH measurements were taken on a Denver Instruments (model 250 pH-ISE-Conductivity Meter). This instrument has a pH resolution of about 0.001. Calibration was done using pH buffer solutions from Fischer Chemicals of pH 4, 7, and 10. Automatic checks of the electrode are built into this system.

The surface chemistry of the silica-titania composite was evaluated using the XPS utilizing PHI ESCA spectrometer (model 5400, Perkin-Elmer, Minnesota, having energy resolution of ±0.1 eV, at a base pressure of $5 \times 10^{-9}$ Torr using Mg K$\alpha$ radiation (1253.6 eV)). The X-ray power during the analysis was 300 W. Both the survey and the high-resolution narrow-scan spectra were recorded at the pass energies of 44.75 and 35.75 eV, respectively, to achieve the maximum spectral resolution. The binding energy (B.E.) of the Au $4f_{7/2}$ at 84.0±0.1 eV was used to calibrate the binding energy (B.E.) scale of the spectrometer. Any charging shifts produced by the samples were carefully corrected using the C (1s) B.E. level of 284.6 eV in the adventitious carbon.

A Fourier Transform Infrared (FTIR-Spectrum One system, having wavelength range 7,800-350 $cm^{-1}$ with KBr beamsplitter) was utilized for measurement of the transmission spectra over the wavelength range of 1.5 to 5 micrometers. The resolution of the system is 0.5 $cm^{-1}$ with a wavelength accuracy of 0.1 $cm^{-1}$ at 1,600 $cm^{-1}$. The FTIR was used to measure the transmission of the bare chalcogenide glass controls and coated chalcogenide glass samples according to the invention. The alignment of the sample was provided through an alignment board and complimentary screw inserted sample holder. All measurements were reproduced multiple times to verify results obtained.

Figure 2:
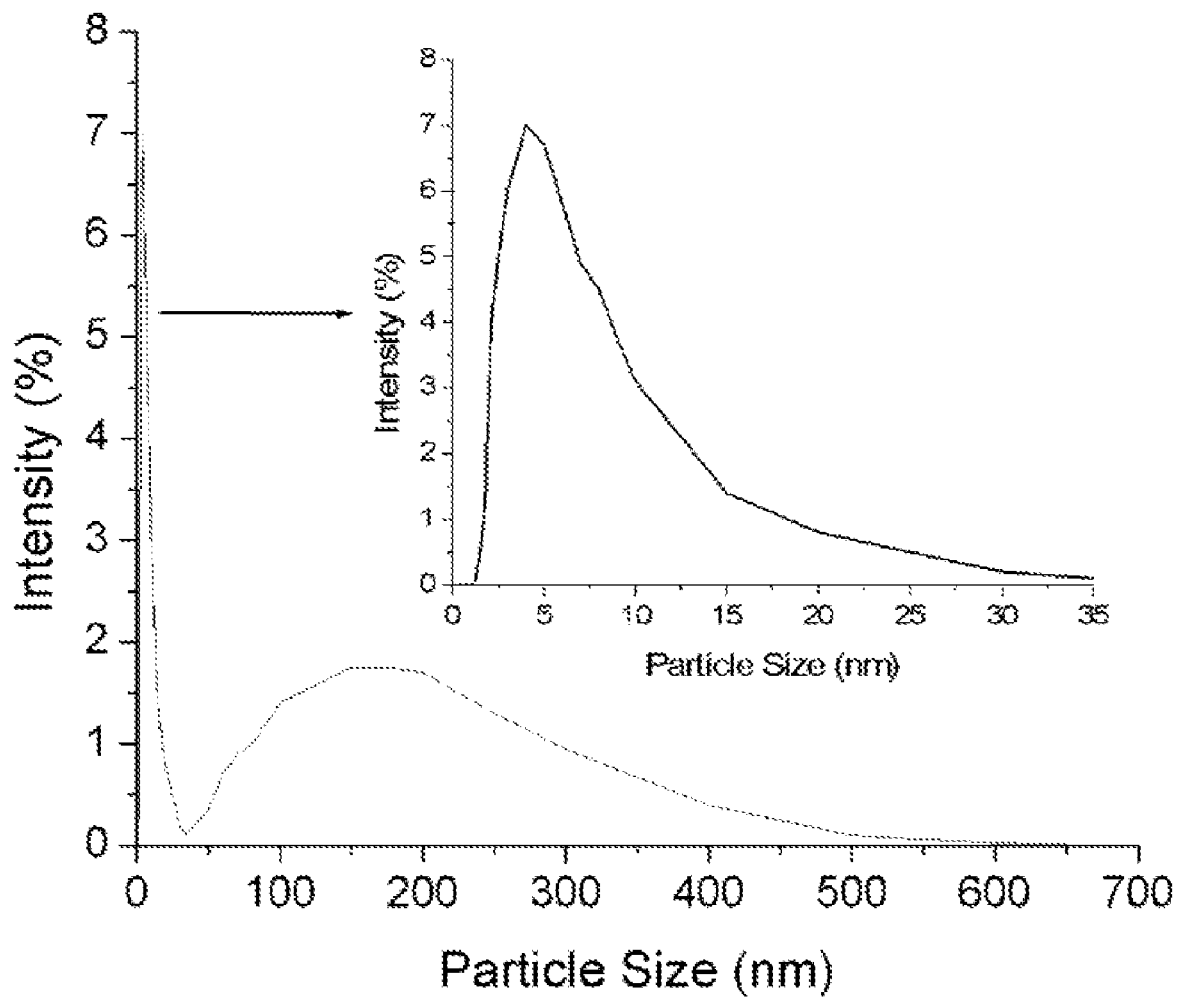
FIG. 2 are graphs showing the particle size distribution for silica particles obtained from the process detailed in FIG. 1. There are two main size distributions, one centered between about 2-10 nm, and another distribution centered at about 100-200 nm which represents agglomerates of silica particles.

Commonly found with silica derived sol-gels are particle sizes that are approximately 50 nm. In many cases, it is beneficial to create a less dense film, for the purposes of increasing transmission at the sacrifice of mechanical properties. Chalcogenide lenses may not be thermally stable, also having low resistance to abrasion which could affect the transmission quality of the glass. The sol-gel method can significantly enhance the abrasion resistance of the chalcogenide. FIG. 2 are graphs showing the silica particle size distribution obtained from the process described relative to FIG. 1. There are two main size distributions, one having a peak centered between about 2-10 nm and another having a peak centered at about 100-200 nm which represents agglomerated particles. The agglomerated particles are generally undesirable and can be removed by filtration. Although not shown in any Figure, the size distribution of the titania particles was also similar to the size of the silica particles.

The pH of the sols, along with composition and preparation, can alter the size of the particles within the sol. The silica sol was extremely acidic, at a pH of approx. 1. This was then offset by the neutral nature of the Titania sol, pH of approx. 7, in the composite sol. The final pH of the composite sol was about 5. In a pure silica system it has been determined that a lower pH, approximately 2.5 or lower, indicates growth towards linear chains, thereby forming a denser film, moving away from particles. In the opposite case at a pH of 7.5 or above, the particles are spherical creating a very porous film.

The final composite sol gel film can generally be described as being homogeneously distributed which is ensured by thorough mixing as described herein. Although there may be some segregation of titania and silica particles in the coating, such as short chains of silica and/or titania, in practical applications the size of the beam of light to be processed will be significantly larger than the spatial extent of any segregation thus averaging out any segregation effect on optical performance of the coating.

As noted above, the refractive index is important parameter for AR coatings. The refractive index is known to be one of the major difficulties in creating AR coatings for chalcogenides and other optical substrates. Chalcogenides are known for their high refractive indices that are also non-linear in nature. In this case, the chalcogenide glass substrate used had a refractive index close to 2.7 at 3 microns. The refractive index is would change significantly as the incident light progressed further into the infrared region, but the intrinsic non-linearity was significantly avoided in the present research due to the focus on the region between 1-5 micron wavelengths. Focusing on a refractive index of 2.7, the closest approximation of the index of refraction of the glass averaging out dispersion effects, an attempt was made to fine tune a composite sol-gel to the aforementioned square root refractive index value, of about 1.64.

In order to create such a refractive index, two solutions of known refractive index were combined to effectively average to the desired refractive index. The first solution, silica sol has a known refractive index of about 1.25 and the second solution, titania sol has a known refractive index of about 1.91. The combination of the two was expected to be an average of the two, based on the amount of each solution.

Figure 3:
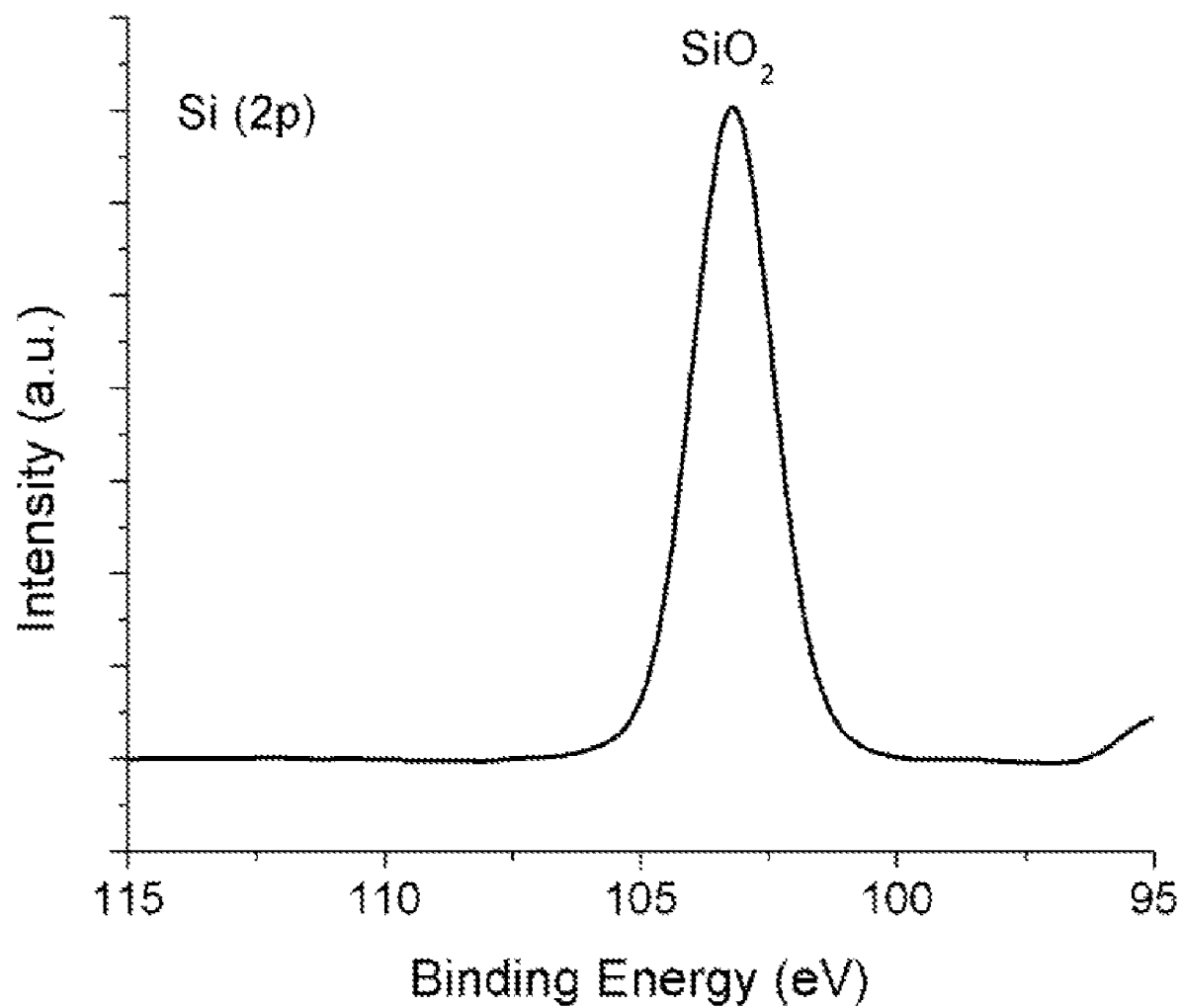
FIG. 3 is a X-ray photoelectron spectroscopy (XPS) Si (2p) spectrum evidencing $SiO_2$ formation. The peak is centered at 103.2 eV indicates the presence of $SiO_2$. No other peaks are present indicating that essentially all of the silicon is in this form.
Figure 4:
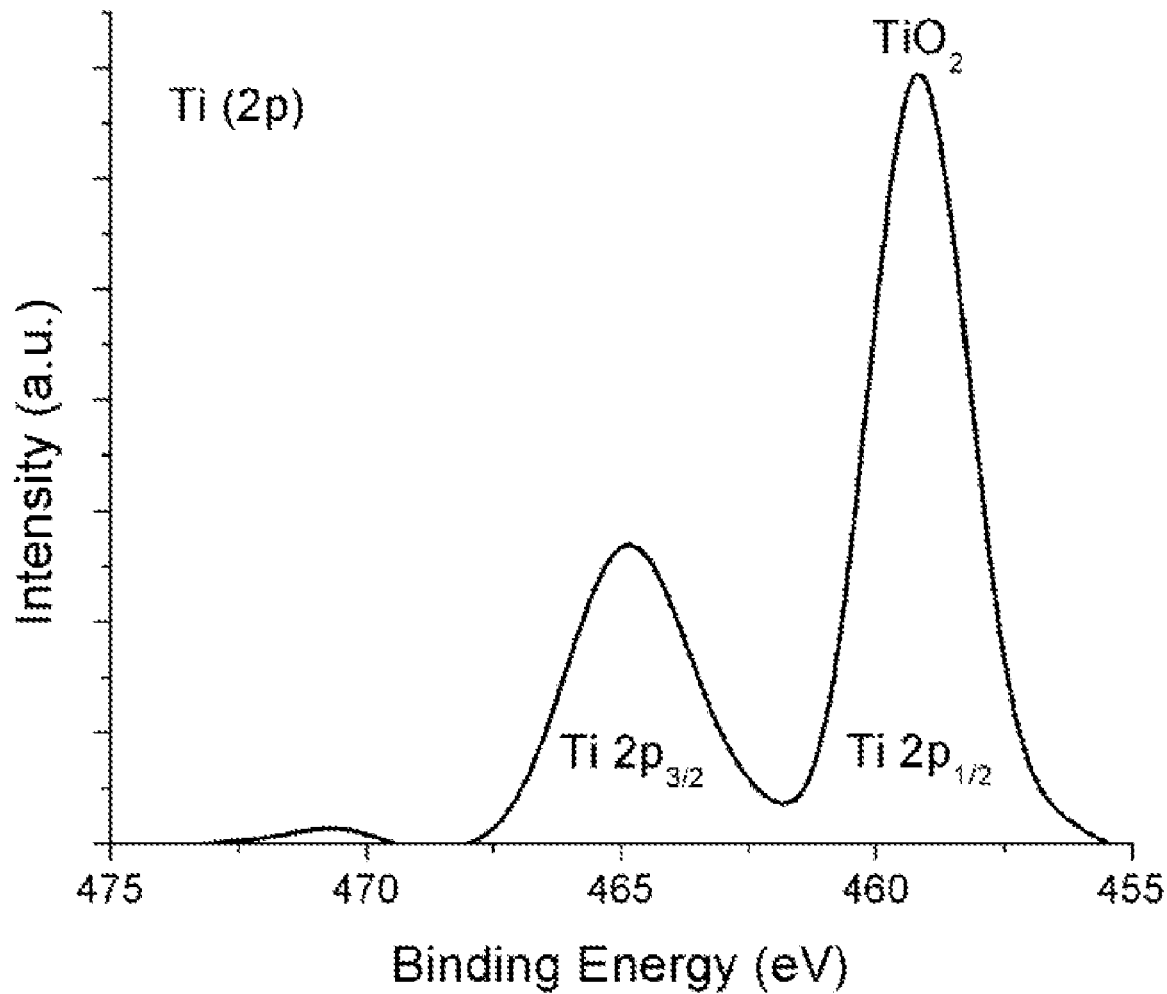
FIG. 4 is a XPS Ti (2p) spectrum evidencing formation of $TiO_2$. The peak is centered at a binding energy of 459.16 eV signifying the presence of $TiO_2$. No other peaks are present indicating that essentially all of the titania is in this form.
Figure 5:
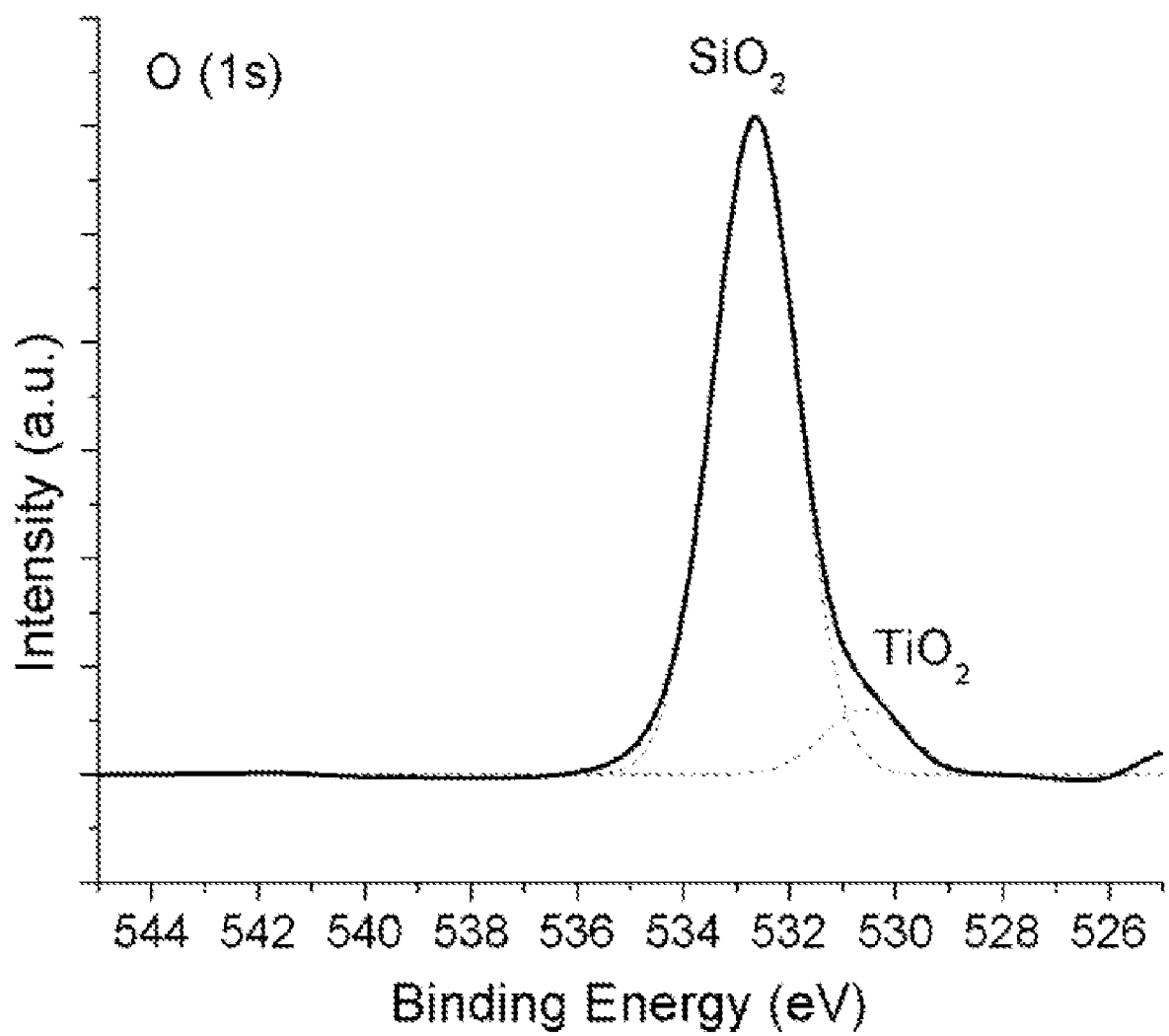
FIG. 5 is a XPS O (1s) spectrum evidencing formation of $SiO_2$ and $TiO_2$. The $SiO_2$ peak is centered at a binding energy of 532.7 eV. The second peak, $TiO_2$, is located at 530.4 eV.

FIGS. 3-5 provide XPS data taken after ambient storage for two weeks that evidence that the composite sol-gel formed as described above included O, Si, and Ti as expected. FIG. 3 is a XPS Si (2p) spectrum evidencing $SiO_2$ formation. The peak is centered at 103.2 eV indicating the presence of $SiO_2$. No other peaks are present indicating that essentially all of the silicon is in the form of $SiO_2$. FIG. 4 is a XPS Ti (2p) spectrum evidencing formation of $TiO_2$. The peak is centered at a binding energy of 459.16 eV signifying the presence of $TiO_2$. No other peaks are present indicating that essentially all of the titanium is in this form. FIG. 5 is a XPS O (1s) spectrum evidencing formation of $SiO_2$ and $TiO_2$. The $SiO_2$ peak is centered at a binding energy of 532.7 eV. The second peak, $TiO_2$, is located at 530.4 eV.

Through heat treatments commonly used the $OH^-$ species can be removed, increasing the porosity and lowering the refractive index of the coating. However, this step was not necessary as the coating performed well without such treatments. Similar heat treatments are usually performed on titania sol-gel coatings, mainly to create a crystalline structure. The basic drying procedure involves a heating at 100° C. in order to dry the coatings and then using increased heat, generally between 400° C. and 1000° C., to achieve the desired level of crystallinity. However, using the invention, heating is preferably limited to 100° C. which has been found to leave the $TiO_2$ in a highly amorphous state. As noted above, the Ti (2p) peak in FIG. 4 evidences the amorphous nature of $TiO_2$ with a peak at 459.2 eV.

The composite coating according to the invention uses the particular refractive index of sol-gel derived silica which is 1.25. Thus, any decrease in refractive index due to conventional thermal treatments above 100° C. would not be desirable. Also, the titania portion of the coating is more porous in its non-crystalline form than after it has been thermally treated shown in literature during heat treatments whereby the titania is crystallized. This increased porosity lowered the titania refractive index to a value of 1.91. With the combination of the two sol-gels, as previously discussed, the refractive index of the resulting composite coating can be set to any desired value between the refractive indexes of silica and titania, such as near 1.64.

An important aspect of the invention relates to the creation of a sol-gel derived AR to maximize transmission of light at certain wavelengths of interest. The composite coating was designed to enhance transmission at three such wavelengths, 1.5 micron, 3.5 micron, and 5 micron. These three wavelengths represent commonly utilized wavelengths of the near infrared region. Some common applications such as low cost optics by molding of chalcogenide glass, photo-darkening, or the use of chalcogenides for microbiological function used in early tumor diagnosis with the aid of specialized sensors capable of recording infrared signals of biomolecules.

Figure 6:
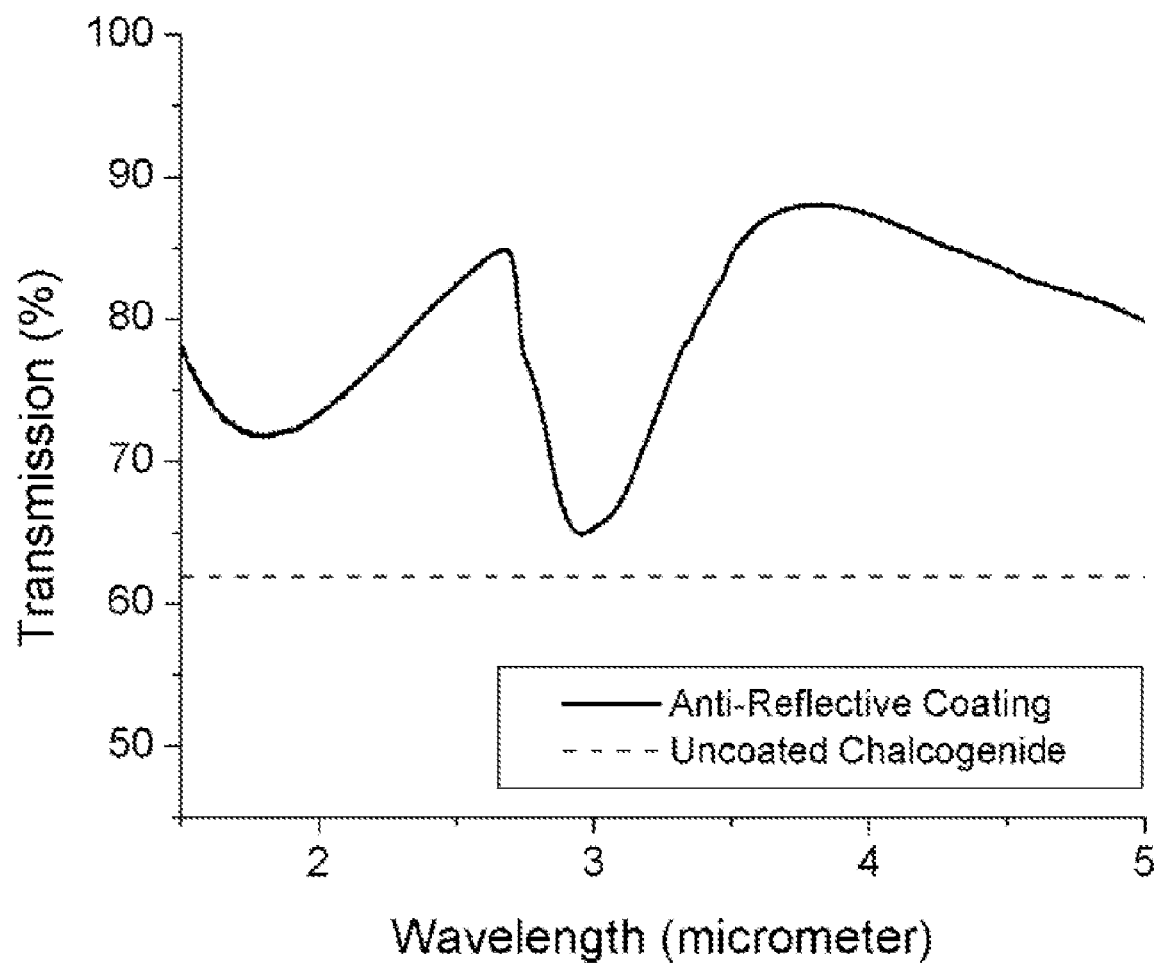
FIG. 6 shows the transmissivity as a % for AR coated chalcogenide substrates according to the invention as compared to uncoated chalcogenide substrates wavelengths from 1.5 to 5.0 micrometer.

FIG. 6 shows the transmission % for AR coated chalcogenide substrates according to the invention as compared to uncoated chalcogenide substrates in the wavelength range from 1.5 to 5 micrometer. The coating thickness was 50 nm and the substrate thickness was about 5 mm. The transmission of the uncoated control in the range of 1.5-5 micron wavelengths was 61.9%. The inventive coating enhanced the transmission at the first key wavelength of 1.5 micrometers to 78%. At the next wavelength of interest, 3.5 micrometers, the increase is very significant. The matching of the substrate and the film is much better, increasing transmission by 22.6%, yielding 84.5% total transmission. In comparison, a typical silica glass system with a base transmission of ~90% is increased to a coating with a final transmission of 99.5% at one particular wavelength and an average that seems closer to 94%. This increase, even at its highest point was only 9%, giving perspective to the incredible 22.6% increase shown in the chalcogenide system. Due to the higher strength requirements of a single coating, prepared presently, the transmission will be sacrificed slightly. Finally, at the wavelength of interest, 5 micrometers, another significant increase in transmission was found relative to the uncoated control. With an increase of 18% at this wavelength from the original 61.9%, there is a substantial increase in transmission.

The ability of a coating to perform within one week of its original creation is an important step in the development of a successful coating. However, it is more relevant to view the functioning of a coating several weeks after its initial application and testing. It is the intrinsic nature of a sol-gel to relax over time, slowly releasing the remaining moisture and solidifying further. The first step towards aging is denoted as polymerization and represented by the condensation reaction $\equiv Si-OH + HO-Si \equiv \rightarrow \equiv Si-O-Si \equiv + H_2$ which link up the initial network. Following polymerization, hydrolysis occurs which further strengthens the network. Hydrolysis is shown by the reaction $\equiv Si-OR + H_2O \rightarrow \equiv Si-OH + ROH$. This reaction is reversible, but with the presence of enough water, can be encouraged to not reverse. This continues until such time as the coating is in equilibrium with its surroundings and the substrate.

As noted above, the coating described in this Example was allowed to age in ambient storage for two weeks and then tested. The relaxation of the film with aging generally involves some densification and thinning of the film. The densification process is believed to be mediated by bond cleavage due to the movement of electrons from the valence band to the conduction. The movement leads to the rearrangement of the gel network through the condensation reaction which causes densification. This densification changes the phase cancellation properties of the reflected waves, affected each of the wavelengths differently. The specific thickness, represented theoretically, does not reflect any incident light. However, as the coating dries it becomes denser and in the process, becomes thinner. Due to the wave-like nature of light, the thickness of the coating determines the phase properties of the reflected waves. The waves incident to the film surface are altered by the refractive index change from the air to the coating. Disregarding the unique nature of sol-gel's surface and porosity, the waves of light of different lengths would be reflected, or not reflected, differently with a different refractive index and film thickness. This affect was found to not significantly affect the final transmission values recorded for coated substrates according to the invention. Accordingly, composite coatings according to the invention are show minimal densification and thinning of the film over time. The impact of the minimal thinning over time of the AR coating is further reduced by the gradient refractive index of the coating as described above.

This invention can be embodied in other forms without departing from the spirit or essential attributes thereof and, accordingly, reference should be had to the following claims rather than the foregoing specification as indicating the scope of the invention.

We claim:

1. An infrared transmissive article, comprising:
an infrared (IR) transmissive substrate, and
a single layer anti-reflective (AR) sol-gel composite broadband coating on a surface of said substrate, said single layer AR coating comprising:
a first metal or semiconductor chalcogenide comprising compound, said first metal or semiconductor chalcogenide compound being essentially all in a metal or semiconductor chalcogenide form;
a second chalcogenide comprising compound different from said first chalcogenide comprising compound intermixed with said first chalcogenide comprising compound, said second metal or semiconductor chalcogenide compound being essentially all in a metal or semiconductor chalcogenide form;

wherein percentages of said first chalcogenide and said second chalcogenide in said single layer AR coating are selected provide a refractive index of said single layer AR coating that approximates the square root of a refractive index of said substrate, and wherein said AR coating is in a highly amorphous state.

2. The article of claim 1, wherein a thickness of said AR coating is <200 nm.

3. The article of claim 1, wherein said first metal or semiconductor chalcogenide comprising compound is silica and said second metal or semiconductor chalcogenide comprising compound is titania.

4. The article of claim 1, wherein a primary particle size distribution in said AR coating has a peak at between about 2-10 nm.

5. The article of claim 1, wherein said substrate is a chalcogenide glass substrate.

6. The article of claim 5, wherein said chalcogenide glass substrate comprises a substrate having a refractive index of around 2.7, wherein said refractive index of said AR coating in a wavelength range from 1 to 5 microns is from 1.62 to 1.66.

7. The article of claim 5, wherein a % transmissivity of said coated substrate averages at least 70% over a majority of a wavelength range from 1.5 to 5 micrometers.

8. The article of claim 1, wherein said AR coating has a gradient of said refractive index across its thickness, wherein said refractive index of said AR coating is lower at its surface as compared to a bulk of said coating.

9. The article of claim 8, wherein gradient comprises a difference in said refractive index from 1 to 5% from said surface to said bulk of said AR coating.

* * * * *